United States Patent [19]
Cole et al.

[11] Patent Number: 5,394,806
[45] Date of Patent: Mar. 7, 1995

[54] RAM FEEDER CARRIAGE SYSTEM

[75] Inventors: Arthur W. Cole, Rowley, Mass.; Franklin A. Hamlyn, Hampton, N.H.; James D. Dougherty, Stamford, Conn.; John M. O'Sullivan, Stony Point, N.Y.

[73] Assignee: Wheelabrator Environmental Systems, Inc., Hampton, N.H.

[21] Appl. No.: 90,007

[22] Filed: Jul. 12, 1993

[51] Int. Cl.⁶ .............................................. F23K 5/00
[52] U.S. Cl. .................................. 104/134; 110/289
[58] Field of Search ............... 104/134, 162, 242; 384/42; 110/289, 290, 291, 109; 414/172

[56] References Cited

U.S. PATENT DOCUMENTS

| | | |
|---|---|---|
| 1,053,020 | 2/1913 | Fetherston . |
| 2,423,110 | 7/1947 | Mosshart . |
| 2,452,804 | 11/1948 | Sulprizio ........................... 384/42 |
| 2,675,276 | 4/1954 | Daugherty ......................... 384/42 |
| 2,719,761 | 10/1955 | Bonnafe ............................ 384/42 |
| 3,279,628 | 10/1966 | Brouwer et al. . |
| 3,350,143 | 10/1967 | Lichowsky ....................... 384/42 |
| 3,651,770 | 3/1972 | Hotti . |
| 3,863,779 | 2/1975 | Stockman . |
| 3,871,287 | 3/1975 | Spillman et al. . |
| 3,934,521 | 1/1976 | Andreoli . |
| 4,018,168 | 4/1977 | Andreoli et al. . |
| 4,184,719 | 1/1980 | Ward ................................. 384/42 |
| 4,440,095 | 4/1984 | Mathieu ........................... 384/42 |
| 4,463,688 | 8/1984 | Andreoli . |
| 4,571,137 | 2/1986 | Malmgren . |
| 4,582,193 | 4/1986 | Larsson . |
| 4,714,031 | 12/1987 | Healy et al. . |
| 4,773,769 | 9/1988 | Church ............................ 384/42 |
| 4,944,383 | 7/1990 | Petrachkoff . |
| 4,978,233 | 12/1990 | Stotzel et al. .................... 384/42 |
| 5,004,097 | 4/1991 | Roinestad et al. . |

FOREIGN PATENT DOCUMENTS

| | | | |
|---|---|---|---|
| 1111989 | 3/1956 | France ........................... 384/42 |
| 698692 | 10/1940 | Germany . |
| 0150507 | 6/1990 | Japan ............................. 384/42 |
| 348601 | 5/1931 | United Kingdom . |

*Primary Examiner*—Mark T. Le
*Attorney, Agent, or Firm*—Banner, Birch, McKie & Beckett

[57] ABSTRACT

A new carriage system for a ram feeder has been designed and is provided. As in the prior art, the carriage system has a drive cart to which is attached a driving force member at one end thereof and a ram member on the other and opposing end thereof. The drive cart is supported by and travels upon a carriage table. The carriage system of the present invention replaces the prior art wheel and flat rail arrangement under the drive cart. The wheels together with the associated problems have been eliminated. In the present invention, the carriage system has a guide member attached to the carriage table and a travel member attached to the underside of the drive cart. The guide member is longitudinally oriented on the carriage table in the direction of drive cart travel and has at least one upper wear portion. The guide member guides the drive cart and the attached ram member during a reciprocating stoke cycle of the driving force member. The travel member has at least one lower wear portion. When the drive cart is in an installed position, the upper wear portion(s) and the lower wear portion(s) are in slidable contact with each other.

18 Claims, 7 Drawing Sheets

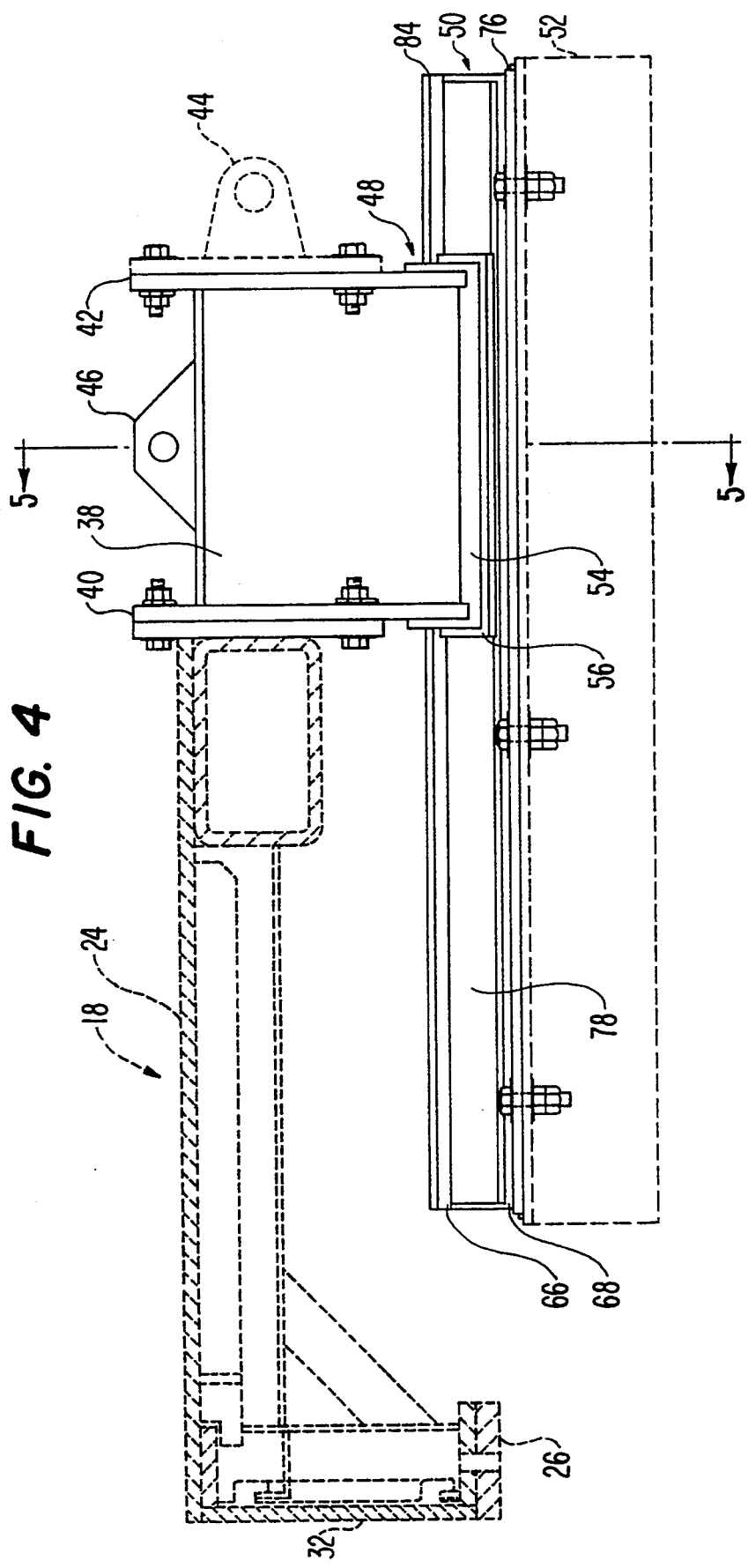

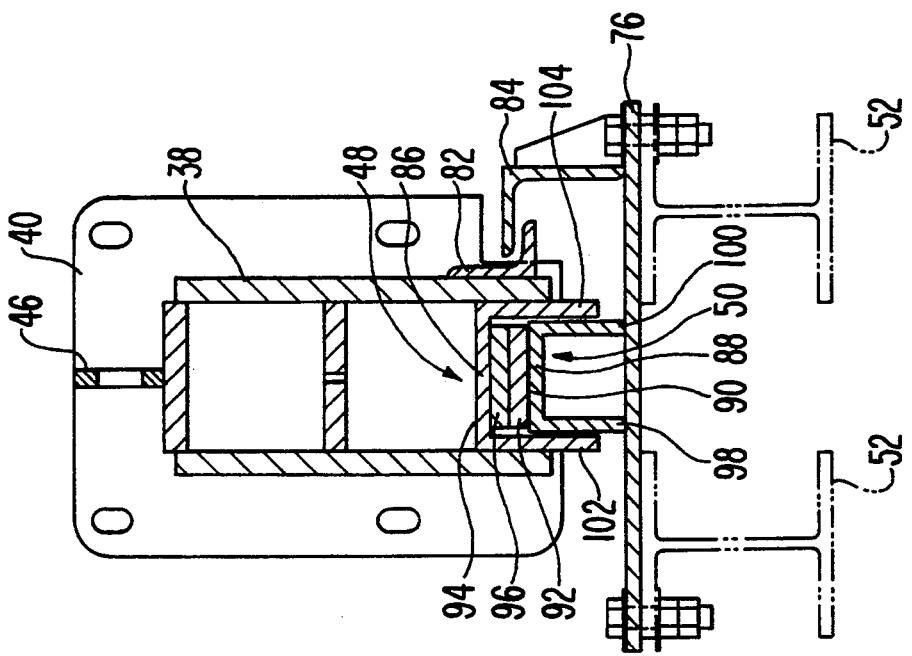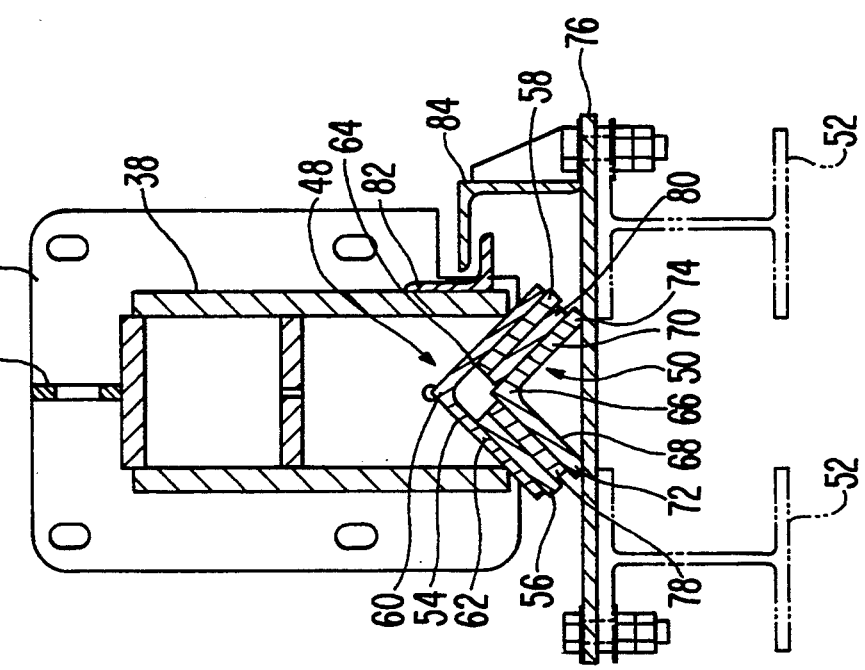

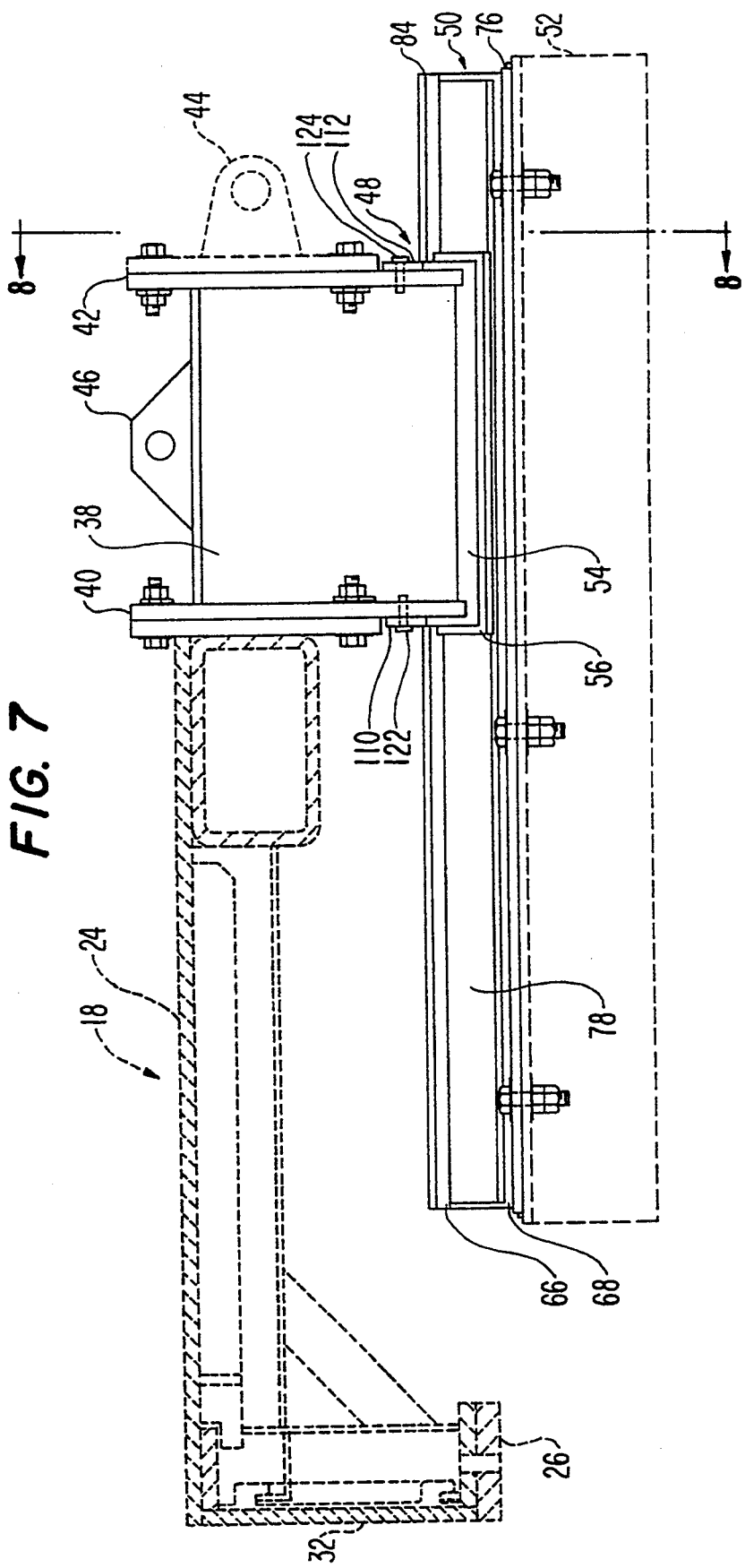

RAM FEEDER CARRIAGE SYSTEM

FIELD OF THE INVENTION

The present invention relates to incinerators, and more particularly to the ram feeder of an incinerator such as those which use refuse as a fuel source and typically generate steam for electrical power generation. Particular aspects of the ram feeder addressed are improvements in ram feeder carriage system design which provide improvements in efficiency (reduction in downtime), reduction in spare parts inventory and/or maintenance reduction.

BACKGROUND OF THE INVENTION

The need to provide environmentally correct and cost effective solutions for the refuse generated in the Unites States became apparent in the late 1960's. At that time, refuse disposal was mainly by land filling and to a lesser extent incineration. It was recognized that landfill space was a finite resource and that refuse itself was an inherent fuel resource that could be utilized to displace other more costly fuel sources in the generation of process steam and electricity.

A refuse to energy plant is composed of several separate and distinct areas. These include: (1) refuse receiving, handling and storage; (2) refuse combustion; (3) heat recovery and electrical generation; and (4) environmental control. The refuse combustion system is of particular interest herein and it typically is composed of the following: (1) refuse feed hopper and chute, (2) ram feeder, (3) grate combustion system, (4) lower furnace combustion zone, and (5) grate ash discharge system. Current conditions require that these systems operate over extended periods of time with limited maintenance. Initial operating results for these types of facilities exhibited extensive maintenance and downtime.

Refuse is introduced to the grate combustion system via a charging hopper and feed chute. Typically, a crane, or in some cases, a front end loader picks up a quantity of refuse from the site receiving and storage area and deposits it into the charging hopper. This charging hopper has a large plan area to facilitate this operation and acts as a funnel to feed the refuse to the feed chute. The feed chute typically is rectangular in cross section and has slightly divergent sides. The width of the feed chute approximates the width of the grate to facilitate uniform refuse fuel flow across the unit. The feed chute and the lower part of the charging hopper are always kept full of refuse to maintain a seal between the combustion zone within the furnace enclosure and ambient, i.e. the exterior of the furnace enclosure.

Refuse from the feed chute exits to a flat, table top surface, directly below. This surface provides a staging area for the refuse to move out onto the grate in a controlled manner beginning the combustion process. A ram feeder, which is a plow-type device, operates on top of this table and is hydraulically driven at a predetermined speed to push the refuse onto the grate. The feeder is considered a volumetric flow controller as it pushes a volume of refuse equal to its height by the plan area of the feed chute discharge opening. The feeding portion of the unit involves the group operation of several parallel ram feeders across the full width of the grate system to insure equal fuel loadings across the unit. Accordingly, refuse is pushed off the table and onto the grate system to start the combustion process within the furnace enclosure.

The speed of the ram in its forward sequence is controlled to provide refuse at a predetermined combustion rate. The ram always retracts at a relatively fast rate to avoid subjecting it to furnace radiant conditions at its most forward position when there is only a limited pile of refuse between the flow and the combustion zone.

The carriage system or drive end of the ram is a cart device riding on small steel wheels connected to the hydraulic ram. The wheels include a conventional shaft and greased bearing arrangement and ride on a flat rail.

The ability of the ram feeder to function properly requires that the wheel driven end operate uniformly in its forward and reverse stroke to maintain ram alignment. Experience has shown that over a several month period, potential areas of failure exist: (1) trash siftings interfere with the ability of the wheels to roll on the rails in a horizontal and uniform mode; (2) trash siftings would cause uneven wear of the wheels; and (3) failure of the greasing mechanism would cause binding and flattening of the round wheels. These occurrences would cause the wheel driven end to seize and move off the rails allowing the ram travel to be in a nonaligned stroke pattern interfering with adjacent rams and increases the required moving force. Accordingly, wheel-driven carriage systems are maintenance intensive and expensive. Further, left unchecked, this interference would cause the rams to eventually destroy each other when this side by side interference occurred during the travel cycle. Additional damage would occur on the riding or carriage table area side walls and support structure once the ram was damaged.

SUMMARY OF THE INVENTION

A new carriage system for a ram feeder has been designed and is provided. As in the prior art, the carriage system has a drive cart to which is attached a driving force member at one end thereof and a ram member on the other and opposing end thereof. The drive cart is supported by and travels upon a carriage table. The carriage system of the present invention replaces the prior art wheel and flat rail arrangement under the drive cart. The wheels together with the associated problems have been eliminated. In the present invention, the carriage system has a guide member attached to the carriage table and a travel member attached to the underside of the drive cart. The guide member is longitudinally oriented on the carriage table in the direction of drive cart travel and has at least one upper wear portion. The guide member guides the drive cart and the attached ram member during a reciprocating stoke cycle of the driving force member. The travel member has at least one lower wear portion. When the drive cart is in an installed position, the upper wear portion(s) and the lower wear portion(s) are in slidable contact with each other.

In a preferred embodiment, the carriage system is a slide plate/rail assembly which is constructed directly under the drive cart. The guide member is preferably an angular rail having an apex and two sides extending outwardly and downwardly from the apex with the other ends of the two sides opposite the apex being attached to the carriage table. The at least one upper wear portion is preferably at least two upper wear members with at least one thereof being attached to the respective upper surface of each side of the angular rail. More preferably, there are two upper wear members each extending the length of the angular rail with each attached to the upper surface of the respective side of the angular rail. The travel member is preferably an angular slide plate also having an apex with two sides extending outwardly and downwardly from the apex thereof. The angular slide plate is attached to the underside of the drive cart. The at least one lower wear portion is preferably at least two lower wear members with at least one thereof being attached to the lower surface of each side of the angular slide plate (i.e., the side opposite the drive cart). More preferably, there are two lower wear members each extending the length of the angular slide plate with each attached to the lower surface of the respective side of the angular slide plate. When the drive cart is in an installed position, the lower wear member(s) rest upon the upper wear member(s) and are in slidable contact with each other such that the lower wear member(s) slidably ride or travel on the corresponding upper wear member(s) during a reciprocating stroke cycle. This arrangement is less sensitive to trash siftings, is self-cleaning and self-guiding, and does not need to be greased. The actual bearing surface is the entire length of the slide plate instead of point contacts as defined by a wheel arrangement.

Accordingly, these and other objects, features and advantages of the present invention will become apparent to those skilled in the art, from a consideration of the following detailed description of preferred embodiments, wherein references made to the figures in the accompanying drawings.

IN THE DRAWINGS

FIG. 4 is a side elevation partly in cross-section of an embodiment of a carriage system according to the present invention.

FIG. 5 is a transverse sectional view taken substantially along line 5—5 of FIG. 4.

FIG. 6 is a transverse sectional view of another embodiment of a slide/rail assembly according to the present invention.

FIG. 7 is a transverse sectional view of another embodiment of a slide/rail assembly of the present invention similar to that shown in FIG. 5.

Figure 9:
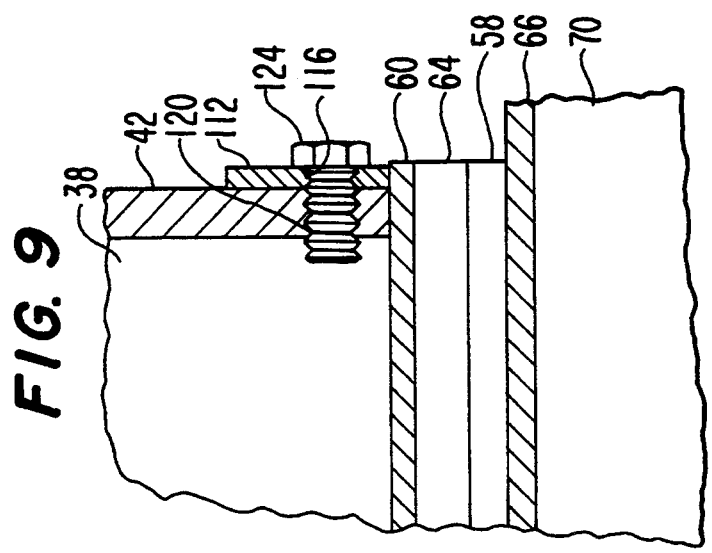
Figure 8:
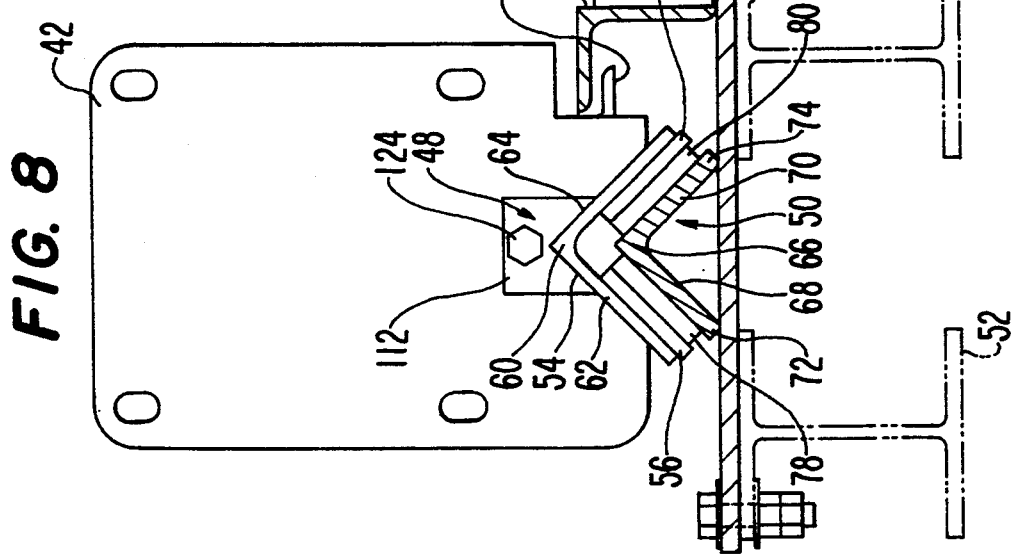
FIG. 8 is a side elevation of the slide/rail assembly shown in FIG. 7 taken substantially along line 8—8 in FIG. 7, but without the connector plate 44.

FIG. 9 is an enlarged partial cross-section of the tab 112 connection to the connector plate 42 which is utilized in the slide/rail assembly shown in FIGS. 7 and 8.

DETAILED DESCRIPTION

In referring herein below to the various figures of the drawings, like reference numerals will be utilized to refer to identical parts and features of the devices shown therein.

Figure 1:
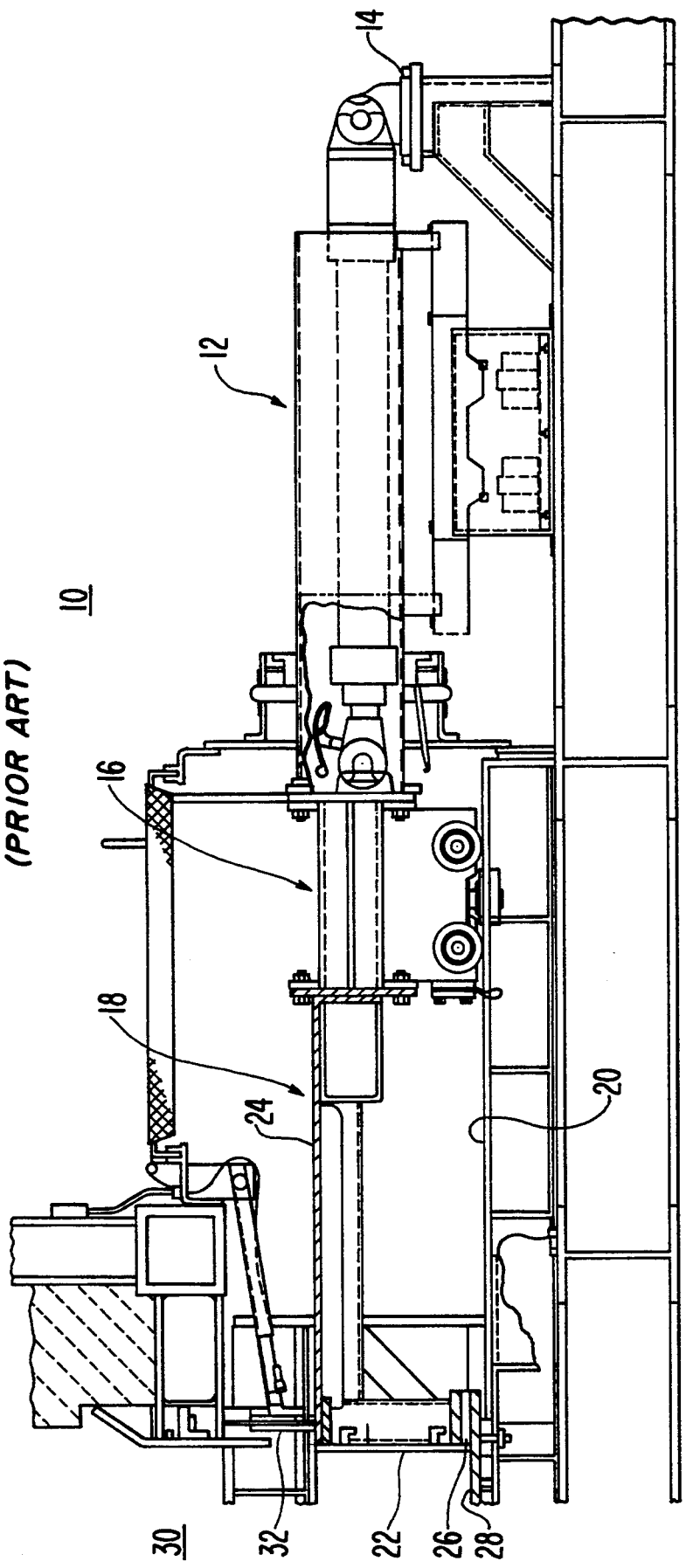
FIG. 1 is a side elevation partly in cross-section of a prior art ram feeder.

Referring now to the drawings, more particularly to FIG. 1, there is shown a ram feeder system 10 according to the prior art. The ram feeder system 10 has a hydraulic piston 12 one end of which is attached to a hydraulic piston anchor 14. The other end of the hydraulic piston 12 is attached to a ram feeder carriage 16. The opposing end of the ram feeder carriage 16 is attached to a ram member 18. The ram feeder carriage 16 is supported by and travels upon a carriage table 20. The ram member 18 has a leading face 22, an upper surface 24 and a lower surface 26. The lower surface 26 is adjacent to and rides upon a ram feeder table 28. As noted earlier, refuse is introduced via a feeder chute 30 and exists to the ram feeder table 28. The ram member 18 in FIG. 1 is shown in a retracted position. As the hydraulic piston 12 extends, the ram feeder carriage 16 travels over the carriage table 20 forcing the ram member 18 forward pushing any refuse adjacent to and in front of the leading face 22 on the ram feeder table 28 toward the interior of the furnace enclosure (not shown). As the hydraulic piston 12 retracts, a lever 32 resting upon the upper surface 24 of the ram member 18 serves to assist in the removal of refuse piled upon the upper surface 24 while the ram member 18 was extended over the ram feeder table 28.

Figure 2:
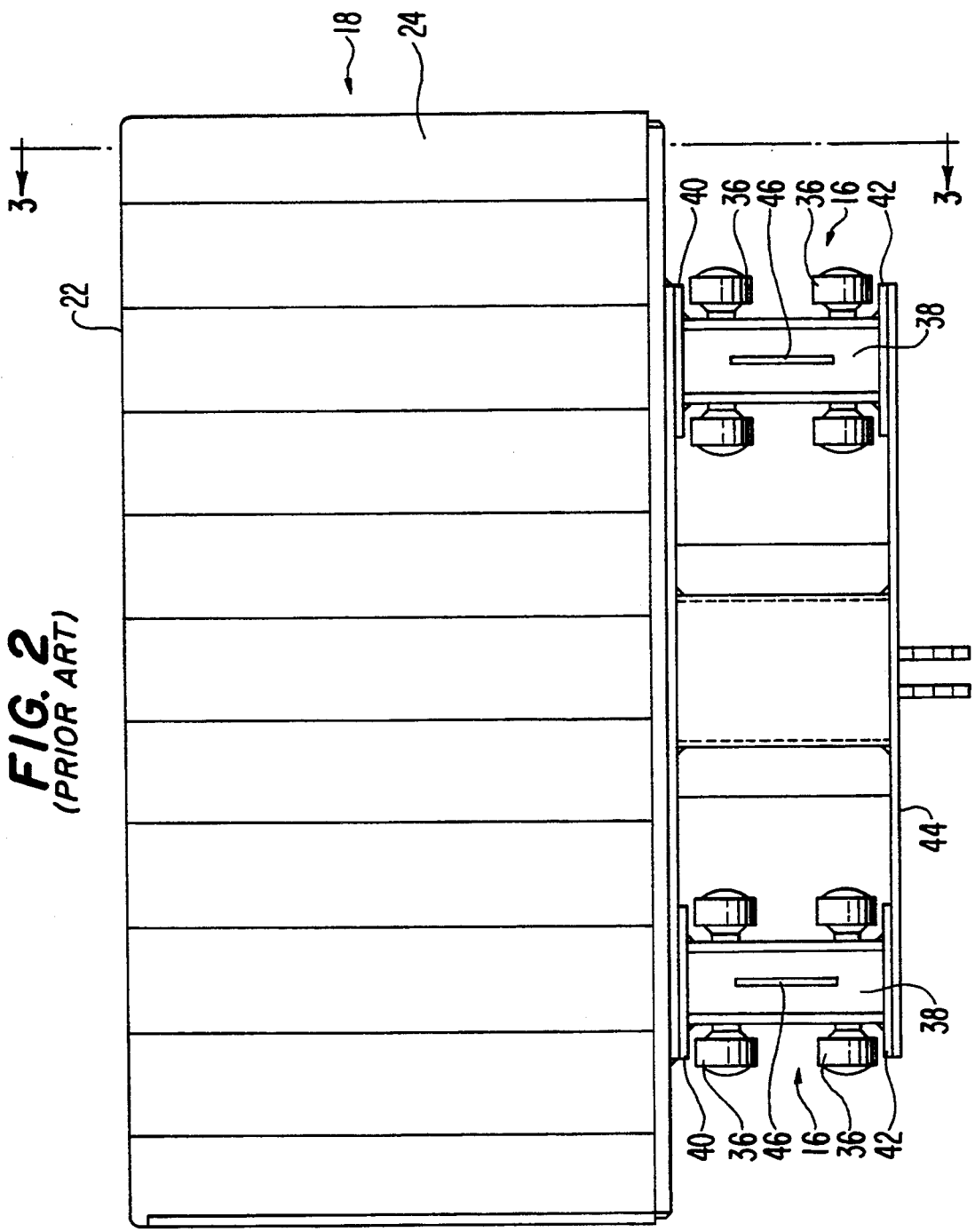
FIG. 2 is a top view of a prior art ram member/-wheeled drive cart assembly.
Figure 3:
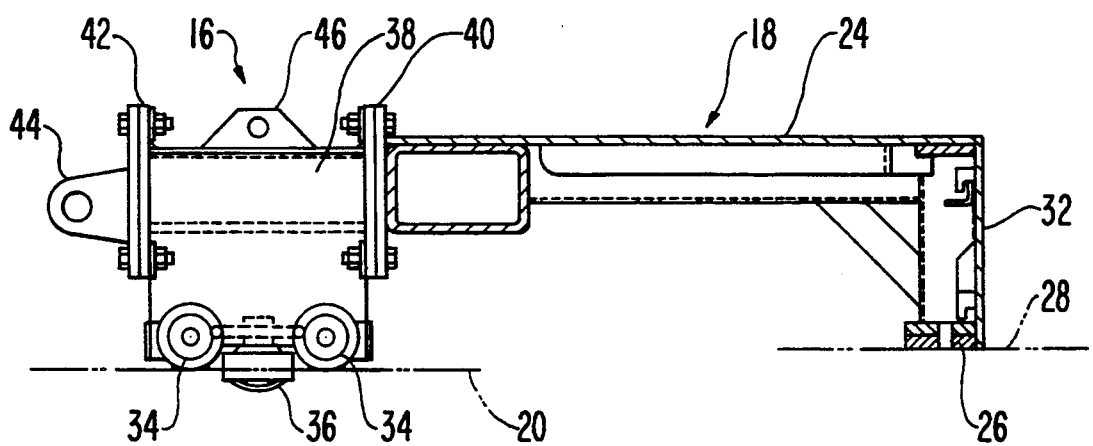
FIG. 3 is a side elevation partly in cross-section of the assembly shown in FIG. 2 taken substantially along line 3—3 of FIG. 2.

Referring now to FIG. 2, there is shown a top view of a ram member 18 attached to two prior art ram feeder carriages 16. FIG. 3 is a side elevation of the assembly shown in FIG. 2 taken essentially along line 3—3 of FIG. 2. The carriages 16 each have four travel wheels 34 and a guide wheel 36 attached to the lower portion of a drive cart 38. The ram feeder table 28 and the carriage table 20 are shown as dotted and dashed horizontal lines in FIG. 3. The guide wheel 36 rides within a slot in the carriage table 20.

The drive cart 38 has a ram connector plate 40 to which is bolted the ram member 18. On the opposite end of the drive cart 38 is a piston connector plate 42 to which is connected a piston connector 44. A lifting eye assembly 46 is provided on the top of the drive cart 38 for ease of removal of the drive cart 38 during maintenance and repair.

Referring now to FIG. 4, there is shown a drive cart 38 with a slide 48 and rail 50 assembly according to the present invention. The ram member 18, piston connector 44 and carriage table support beams 52 are shown in ghost relief (and partly in cross-section where applicable) to emphasize the differences between the carriage system of the present invention and that of the prior art shown in FIGS. 1-3. As is readily apparent, the travel wheels 34 and guide wheel 36 have been eliminated.

Referring now to both FIGS. 4 and 5, the slide 48 is shown to be an angular slide plate 54 attached to the underside of the drive cart 38. The angular slide plate 54 has an apex 60 with two sides 62 and 64 extending downwardly and outwardly from the apex 60. Attached to the lower surface of each side 62 and 64 of the angular slide plate 54 is a first lower wear member 56 and a second lower wear member 58, respectively, each of which extends the length of the angular slide plate 54. The angular rail 50 has an apex 66 with two sides 68 and 70 extending downwardly and outwardly from the apex 66 with the other ends 72 and 74 of the two sides 68 and 70, respectively, opposite the apex 66 being attached to a carriage table section 76. First and second upper wear members 78 and 80, respectively, extend the length of the angular rail 50 with each attached to the upper surface of sides 68 and 70, respectively, of the angular rail 50. The carriage table section 76 is utilized for ease of replacement and repair of the angular rail 50.

When the drive cart 38 is in an installed position, the lower wear members 56 and 58 rest upon the upper wear members 78 and 80, respectively, and are in slidable contact with each other such that the lower wear members 56 and 58 slidably ride or travel on the corresponding upper wear members 78 and 80, respectively, during a reciprocating stroke cycle. To avoid the drive cart 38 jumping off the angular rail 50, a first L-shaped member 82 is attached to one side of the drive cart 38 with an inverted L-shaped member 84 overlap and attached to the carriage table section 76. The horizontally extending portions of the L-shaped members 82 and 84 overlap and engage each other if the drive cart 38 attempts to jump off the rail 50. Accordingly, the L-shaped members 82 and 84 act as anti-lifting means to prevent lifting of the drive cart 38 and derailing of same during the reciprocating stroke cycle.

Turning to FIG. 6, there is shown another embodiment of a slide 48 and rail 50 assembly. In this case, an inverted U-shaped slide plate 86 and an inverted U-shaped rail 88 are shown. On the upper surface of the upper portion 90 of the rail 88 is attached an upper wear member 92. On the lower surface of the upper portion 94 of the slide 86 is attached a lower wear member 96. The ends 98 and 100 of the rail 86 are attached to the carriage table section 76. The sides 102 and 104 (as shown in FIG. 6) or the upper portion 94 of the U-shaped slide 86 (this embodiment not shown) are attached to the underside of the drive cart 38. As before, the lower wear member 96 extends the length of the inverted U-shaped slide 86 and the upper wear member 92 extends the length of the inverted U-shaped rail 88.

The wear members 56, 58, 78 and 80 shown in FIG. 5 and wear members 92 and 96 shown in FIG. 6 preferably have a hardened surface to resist wear as the drive cart is slid upon the respective rail 50 in a reciprocating motion during operation of the ram feeder system 10. More preferably, these wear members are through-hardened materials, preferably having a Brinell hardness of at least about 400, more preferably from about 400 to about 600, for example of through-hardened 500 Brinell hardness manganese steel which work hardens, i.e. gets harder as it is used. The wear members 56, 58, 78 and 80 shown in FIG. 5 and wear members 92 and 96 shown in FIG. 6 are depicted in the form of wear strips. However, these wear strips may be substituted by a plurality of wear pad suitably spaced on their respective rail or slide. The wear members are suitably attached to their respective slide or rail, for example, by welding on or bolting on, preferably by welding on. Similarly, the slide is suitably attached to the drive cart 38 and/or the connector plates 40 and 42, for example by welding or bolting thereto, preferably by bolting for ease of replacement and reuse of the drive cart 38 with associated connector plates 40 and 42. FIGS. 7, 8 and 9 depict such an arrangement wherein tabs 110 and 112 are welded to the ends of the slide 48 in parallel fashion to the connector plates 40 and 42 respectively. Each tab 110 and 112 have a hole 114 (not shown, but like hole 116) and 116 (See FIG. 9). The respective connector plate 40 and 42 have a hole 118 (not shown, but like hole 120) and 120 (See FIG. 9) which corresponds to holes 114 and 116, respectively, which in turn threadedly receive bolts 122 and 124 to attach the slide 48 to the connector plates 40 and 42. Additionally, wear indicators whether mechanical or electrical in nature may be utilized as an indication that the respective wear members are becoming excessively thin and require maintenance and/or replacement, prior to failure thereof.

The drive carts 38 shown in FIGS. 4, 5, 6 or 7 may be directly substituted for the prior art drive carts 38 shown in FIGS. 1–3 and the appropriate rail 50 with carriage table section 76 installed to effect replacement of the prior art drive carts 38.

It is to be understood that the disclosed embodiments are merely illustrative of the principles of the present invention which could be implemented by other types of structures which would be readily apparent to those skilled in the art. Accordingly, the scope of the present invention is to be determined in accordance with the appended claims.

What is claimed is:

1. A carriage system for a ram feeder, the carriage system having a drive cart to which is attached a driving force member at one end thereof and a ram member on the other and opposing end thereof, the drive cart supported by and travelling upon a carriage table, the carriage system comprising:

a guide member attached to the carriage table, said guide member having at least one upper wear surface, wherein said guide member is located on said carriage table and guides said drive cart and attached ram member during a reciprocating stroke cycle of the driving force member; and a travel member attached to the underside of the drive cart, said travel member having at least one lower wear surface, wherein when said drive cart is in an installed position said at least one upper wear surface and said at least one lower wear surface are in slidable contact with each other.

2. The carriage system of claim 1, wherein said guide member is an angular rail having a first apex and two sides extending outwardly and downwardly from the first apex with the ends of the two sides opposite the first apex being attached to the carriage table, said guide member further having at least two upper wear members with at least one thereof being attached to the respective upper surface of each side of the angular rail, each said tipper wear member including an upper wear surface, said travel member is an angular side plate having a second apex with two sides extending outwardly and downwardly from the second apex, wherein said angular slide plate is attached to the underside of the drive cart, said travel member further having at least two lower wear members with at least one thereof being attached to the lower surface of each side of the angular slide plate, each said lower wear member including a lower wear surface.

3. The carriage system of claim 2, wherein:

said at least two upper wear members is two upper wear members each extending the length of the angular rail with each attached to the upper surface of the respective side of the angular rail and said at least two lower wear members is two lower wear members each extending the length of the angular slide plate with each attached to the lower surface of the respective side of the angular slide plate.

4. The carriage system of claim 2, wherein said at least two upper wear members and said at least two lower wear members are comprised of a through-hardened material having a Brinell hardness value of at least 400.

5. The carriage system of claim 2, wherein said at least two upper wear members and said at least two lower wear members are comprised of manganese steel.

6. The carriage system of claim 2, wherein said at least two upper wear members are welded to the respective upper surface of each side of the angular rail and said at least two lower wear members are welded to the respective lower surface of each side of the angular slide plate.

7. The carriage system of claim 2, wherein said at least two upper wear members are bolted to the respective upper surface of each side of the angular rail and said at least two lower wear members are bolted to the respective lower surface of each side of the angular slide plate.

8. The carriage system of claim 2, further comprising anti-lifting means for preventing the lifting and derailing of the drive cart from the guide member.

9. The carriage system of claim 8, wherein said anti-lifting means includes an inverted L-shaped member and an L-shaped member, said inverted L-shaped member attached to the carriage table and having a horizontally extending portion, said L-shaped member attached to said drive cart and having a horizontally extending portion, said horizontally extending portions overlap and engage each other upon the travel member attempting to jump off the guide member during a respective stroke cycle of the drive cart.

10. The carriage system of claim 1, wherein said ram feeder is attached within a refuse-to-energy unit having a ram feeder table and a furnace enclosure interior, said driving force member having a leading surface for contacting and pushing refuse from the ram feeder table into the furnace enclosure interior.

11. The carriage system of claim 10, wherein
said guide member is an angular rail having a first apex and two sides extending outwardly and downwardly from the first apex with the ends of the two sides opposite the first apex being attached to the carriage table,
said guide member further having at least two upper wear members with at least one thereof being attached to the respective upper surface of each side of the angular rail, each said upper wear member including an upper wear surface,
said travel member is an angular side plate having a second apex with two sides extending outwardly and downwardly from the second apex, wherein said angular slide plate is attached to the underside of the drive cart,
said travel member further having at least two lower wear members with at least one thereof being attached to the lower surface of each side of the angular slide plate, each said lower wear member including a lower wear surface.

12. The carriage system of claim 11, wherein:
said at least two upper wear members is two upper wear members each extending the length of the angular rail with each attached to the upper surface of the respective side of the angular rail, and
said at least two lower wear members is two lower wear members each extending the length of the angular slide plate with each attached to the lower surface of the respective side of the angular slide plate.

13. The carriage system of claim 11, wherein said at least two upper wear members and said at least two lower wear members are comprised of a through-hardened material having a Brinell hardness value of at least 400.

14. The carriage system of claim 11, wherein said at least two upper wear members and said at least two lower wear members are comprised of manganese steel.

15. The carriage system of claim 11, wherein said at least two upper wear members are welded to the respective upper surface of each side of the angular rail and said at least two lower wear members are welded to the respective lower surface of each side of the angular slide plate.

16. The carriage system of claim 11, wherein said at least two upper wear members are bolted to the respective upper surface of each side of the angular rail and said at least two lower wear members are bolted to the respective lower surface of each side of the angular slide plate.

17. The carriage system of claim 11, further comprising anti-lifting means for preventing the lifting and derailing of the drive cart from the guide member.

18. The carriage system of claim 17, wherein said anti-lifting means includes an inverted L-shaped member and an L-shaped member, said inverted L-shaped member attached to the carriage table and having a horizontally extending portion, said L-shaped member attached to said drive cart and having a horizontally extending portion, said horizontally extending portions overlap and engage each other upon the travel member attempting to jump off the guide member during a respective stroke cycle of the drive cart.

* * * * *

UNITED STATES PATENT AND TRADEMARK OFFICE
CERTIFICATE OF CORRECTION

PATENT NO. : 5,394,806

DATED : March 7, 1995

INVENTOR(S) : Arthur W. Cole, Franklin A. Hamlyn, James D. Dougherty and John M. O'Sullivan It is certified that error appears in the above-identified patent and that said Letters Patent is hereby corrected as shown below:

Column 6, line 39, replace "tipper" with --upper--.

Signed and Sealed this

Twenty-third Day of May, 1995

Attest:

BRUCE LEHMAN

*Attesting Officer*     *Commissioner of Patents and Trademarks*